Jan. 31, 1933.  O. JUNGGREN  1,895,930
SHAFT PACKING
Filed Aug. 27, 1931
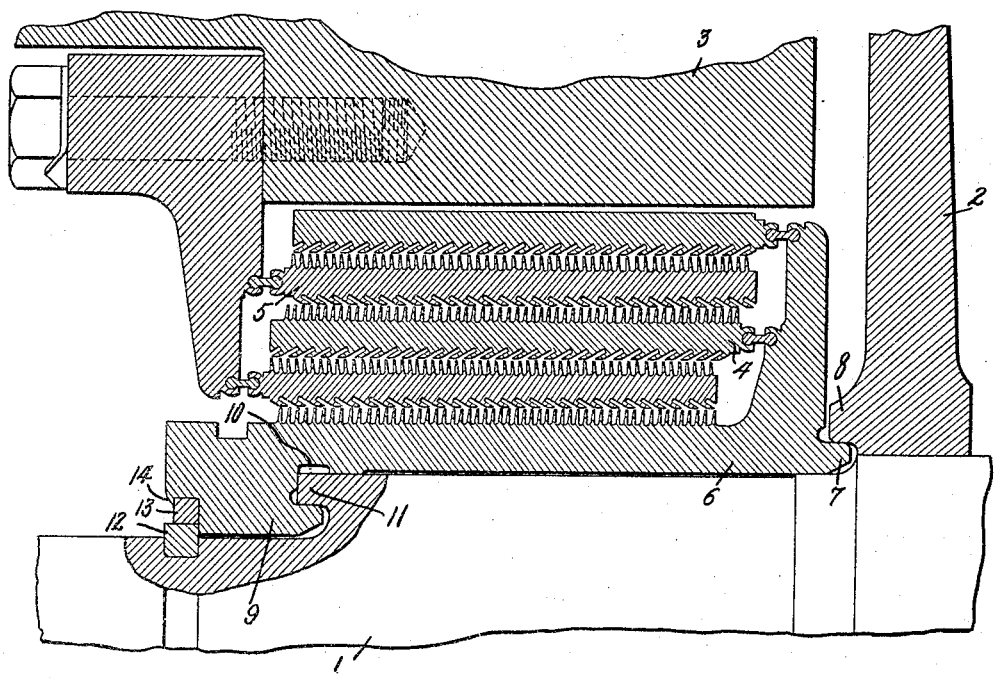
Inventor:
Oscar Junggren,
by Charles E. Tullar
His Attorney.

Patented Jan. 31, 1933

1,895,930

UNITED STATES PATENT OFFICE

OSCAR JUNGGREN, OF SCHENECTADY, NEW YORK, ASSIGNOR TO GENERAL ELECTRIC COMPANY, A CORPORATION OF NEW YORK

SHAFT PACKING

Application filed August 27, 1931. Serial No. 559,756.

The present invention refers to shaft packings, particularly to packings of the type disclosed in my Patent No. 1,670,071.

Difficulties have been encountered in properly providing packings for elastic fluid turbines operating with high temperature and high pressure elastic fluid of the orders of 1200 lbs. for example. Specifically it has been found that owing to unequal ratios of expansion of different parts, the inner packing member which heretofore has been shrunk on to the shaft becomes loose and permits leakage of elastic fluid along the shaft. It will be readily understood that the loosening occurs particularly during the starting of the turbine as the inner packing member which is in direct contact with the high temperature fluid heats up more rapidly than the shaft. Although the clearance between the shaft and the inner packing member which is due to this unequal expansion is small it will permit under the high pressure conditions in modern turbines a substantial loss of fluid.

The object of my invention accordingly is an improved arrangement, primarily of the inner packing member of elastic fluid turbines, although it is not necessarily limited thereto.

For a consideration of what I believe to be novel and my invention, attention is directed to the following description and the claims in connection with the drawing appended hereto.

In the drawing I have shown, by way of example, a sectional view of a packing applied to an elastic fluid turbine embodying my invention.

Referring to the drawing, 1 designates a rotary turbine shaft, 2 is a bucket wheel fastened to the shaft and 3 indicates the turbine casing through which the shaft passes and between which and the shaft it is desired to prevent leakage. The packing comprises inner rotary and outer stationary packing members 4 and 5 carried by the shaft and the casing respectively and provided with cooperating packing teeth which in the one instance are straight and have very thin packing edges and in the other instance are sloping and have flat, axially extended surfaces against which the teeth with the thin edges pack. The sloping teeth point in a direction opposite to the direction of flow of leakage fluid. Whereas I have shown only the upper part of the structure it should be understood that these elements are cylindrically formed and are concentrically arranged with respect to the turbine shaft. The structure so far described may be taken as typical for any packing surrounding a rotary shaft.

In order to prevent loosening of the inner packing member 6 which is in direct contact with the high pressure, high temperature elastic fluid and therefore expands more rapidly than the shaft, I provide according to my invention means for locking the inner packing member 6 to the shaft whereby a substantial relative expansion between these parts is eliminated. This means has been shown in the present instance as comprising an annular, axially extending projection 7 integrally formed with one end of packing member 6 and engaging the undercut hub of wheel disk 2. The other end of member 6 is shown as being integrally formed with a flanged portion 9 which is undercut at 10 and engages the under side of an annular shoulder 11 of the shaft. In assembling, the packing member 6 is slid over the shaft until members 7 and 9 engage the under sides of parts 8 and 11 respectively. In order to prevent axial movement of ring 6 I provide a spring ring 12 engaging an annular groove of the shaft. Ring 12 is held in its position by another spring ring 13 engaging the outer surface of ring 12 and a shoulder of member 6. Ring 13 is maintained in its position by peening over the edge of ring 6 as indicated at 14.

From another viewpoint the rotary shaft 1 and wheel disk 2 represent a machine part provided with shoulders 8 and 11 having recesses at different horizontal planes. One end, 7, of member 6 defines a projection which is located within the recess of shoulder 8, whereas the recess provided in shoulder 11 receives a recessed flanged portion 9 at the other end of member 6.

From a consideration of the drawing in connection with the above description it will be readily understood that the means for securing the inner packing member to the shaft are readily adapted to prevent substantial relative movement between this member and the shaft to the effect that no leakage between the ring and the shaft can occur. It will also be seen that the joints which are formed between members 7 and 8, and 9 and 11 respectively are tightened during the starting operation owing to the fact that member 6 is in direct contact with the high temperature elastic fluid and therefore heats up more rapidly than the shaft. The engagement between the inner packing member and the shaft is therefore tightened during starting which is just the opposite effect to that obtained with arrangements heretofore used.

Having described my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In combination, a rotating shaft having an undercut shoulder, a wheel disk having an undercut hub fastened to the shaft, a packing surrounding the shaft and including an inner packing member carried by the shaft, and means for preventing substantial relative radial expansion between the inner member and the shaft, said means comprising an undercut flanged portion integrally formed with one end of the inner member and engaging the underside of said shoulder, and an annular projection integrally formed with the other end of the inner member and engaging the undercut hub of the disk.

2. In combination, a machine part having two shoulders spaced apart and provided with recesses in different planes, a member, and means for locking the member to said machine part to prevent during heating relative expansion therebetween, said means comprising a projection provided at one end of the member and located within one of the recesses, a recessed flanged portion at the other end of the member for receiving the other recessed shoulder of the machine part, and a key for holding the member in interlocked relation with the machine part.

In witness whereof I have hereunto set my hand.

OSCAR JUNGGREN.